United States Patent [19]

Peterson

[11] 4,003,947

[45] Jan. 18, 1977

[54] COATING COMPOSITION AND METHOD OF COATING SUBSTRATES THEREWITH

[75] Inventor: Marvin A. Peterson, Fort Wayne, Ind.

[73] Assignee: General Electric Company, Fort Wayne, Ind.

[22] Filed: June 3, 1974

[21] Appl. No.: 475,483

[52] U.S. Cl. .................. 260/471 R; 260/46.5 E; 260/47 CP; 260/49; 260/65; 260/78 TF; 260/448.2 B; 260/448.2 H; 260/448.2 N; 260/558 A; 260/559 D; 260/926; 260/934

[51] Int. Cl.$^2$ ................................ C07C 103/74

[58] Field of Search ........ 260/471 R, 558 A, 47 CP, 260/78 TF, 65, 46.5 E, 49, 448.2 B, 448.2 H, 448.2 N, 926, 934, 559 D

[56] References Cited

UNITED STATES PATENTS

| | | | |
|---|---|---|---|
| 3,505,295 | 4/1970 | Grunsteidl et al. | 260/77.5 |
| 3,652,500 | 3/1972 | Peterson | 260/65 |
| 3,663,510 | 5/1972 | Peterson | 260/65 |

*Primary Examiner*—Lester L. Lee
*Attorney, Agent, or Firm*—Joseph E. Papin

[57] ABSTRACT

A coating medium for application to a substrate to form a coating which is curable to a highly cross-linked polymeric state. A coating medium is prepared by reacting, in a suitable solvent for at least one reactant, an aromatic diamine and an aromatic dianhydride, with the reactants in the molar ratio of two-to-one respectively. The diamine is dissolved in a solvent, and the dianhydride is slowly added to the solution to form a diamide-diacid-diamine monomer. The reaction is carried out at a temperature below that at which imidization occurs. The reaction product may be made water soluble by the addition of a volatile base. A coating of the medium is applied to a substrate as a thin film and the film coating is cured at a temperature sufficient to form a highly cross-linked polymeric coating on the substrate. Suitable aromatic dianhydride reactants include 3,3′,4,4′-benzophenonetetracarboxylic dianhydride and 4,4′-(2-acetoxy-1,3-glyceryl)bis-anhydro trimellitate, and suitable aromatic diamine reactants include 4,4′-diaminodiphenyl methane, 4,4′-diaminodiphenyl ether, and 1,3-diamino benzene. Upon application of a coating of the monomer solution to a substrate and upon cure of the coating to drive off the solvent and effect polymerization, intermolecular amidization and imidization reactions occur resulting in what are believed to be highly cross-linked ladder-type polymeric coatings.

5 Claims, No Drawings

COATING COMPOSITION AND METHOD OF COATING SUBSTRATES THEREWITH

FIELD OF THE INVENTION

The present invention relates to coating compositions for producing polymeric coatings on substrates, and more particularly to aqueous based polymeric coating compositions produced from the reaction product of aromatic diamines and aromatic dianhydrides. More specifically, the invention relates to a coating composition, a process for producing coating compositions of the foregoing character a process for coating substrates therewith, coatings produced thereby, and to coated substrates.

BACKGROUND OF THE INVENTION

Polyamide and polyimide coating materials and coatings produced therefrom are generally well known in the art. See, for exampe, U.S. Pat. No. 3,652,500, issued Mar. 28, 1972, to M. A. Peterson, for "Process For Producing Polyamide Coating Materials By End Capping"; U.S. Pat. No. 3,663,510, issued May 16, 1972, to M. A. Peterson, for "Process For Producing Polyamide Coating Materials"; U.S. Pat. No. 3,507,756, issued Apr. 21, 1970, to F. F. Holub and M. A. Peterson, for "Method For Electrocoating A Polyamide Acid"; U.S. Pat. No. 3,179,614, issued Apr. 20, 1965, to W. M. Edwards, for "Polyamide Acids, Compositions Thereof, And Process For Their Preparation"; U.S. Pat. No. 3,179,634, issued Apr. 20, 1965, to W. M. Edwards, for "Aromatic Polyimides And The Process For Preparing Them"; and U.S. Pat. No. 3,190,856, issued June 22, 1965 to E. Lavin, et al, for "Polyamides From Benzophenonetetracarboxylic Acids And A Primary Diamine". The prior art involves generally the preparation of a coating medium containing a high molecular weight polyamide acid, and application of the coating medium to substrate to provide a polyamide acid coating thereon, followed by the curing of the high molecular weight polyamide acid to a polyamide. To the extent necessary for a more complete understanding of the present invention, reference should be made to the above listed patents, the disclosures of which are herein incorporated by reference.

Commercially available coating materials for use in electrical applications, such as the coating materials disclosed in U.S. Pat. No. 2,936,296, issued May 10, 1960 to F. M. Precopio and D. W. Fox for "Polyesters From Terephthalic Acid, Ethylene Glycol and a Higher Polyfunctional Alcohol", and used and sold commercially under the trademark "ALKANEX" by General Electric Company, are widely used, highly successful and effective compositions, but have one economic disadvantage in that they involve and require the use of organic solvents. Where organic solvents are used, they are driven off during cure and are generally not economically recoverable. It is therefore ecologically and environmentally desirable to utilize substantially water based solvents.

Aqueous base polyamide acid systems of the type described in the above-mentioned patents to Peterson result in high temperature electrical grade coatings (230° C., 20,000 hr. class insulation coating) are stable, and easily made and used, but are quite expensive compared to the polyester compositions. Aqueous base acrylic systems, of the type described in U.S. Pat. No. 2,787,603, issued Apr. 2, 1957 to P. F. Sanders for "Aqueous Coating Compositions and Substrates Coated Therewith", while inexpensive, are not generally suitable for high temperature electrical grade coatings applications such as class B applications (i.e., 130° C., 20,000 hours). Moreover, such aqueous base acrylic systems are emulsions and not solutions, thereby creating certain stability problems.

In water base systems, because of the high latent heat of vaporization, it is desirable to utilize as high a solids content as is possible commensurate with workable viscosities because the medium must be used with automatic coating apparatus such as wire towers. High molecular weight polymers, such as the polyamide polymers which are described in the patents listed above, produce extremely viscous solutions except in relatively low solids content systems. For many applications the low solids content systems are quite suitable. For high speed wire tower use, however, the low solids content aqueous solution create production problems which reduce the efficiency of the tower and in some cases result in under-cured coatings.

OBJECT OF THE INVENTION

It is the principal object of the present invention to provide a composition for application from either an organic or an aqueous based medium of high solids content to form a coating on a substrate, which coating may, upon curing, be converted to a highly cross-linked polymeric coating.

A more specific object of the present invention is to provide a new and improved coating material for producing a flexible, elastic, clear, adherent, nontacky dielectric coating on a substrate.

Another object of the present invention is to provide a new and improved monomeric coating medium which may be applied as a thin film coating on a substrate from either an organic solvent solution or an aqueous-organic solvent system and which when cured produces a coating having characteristics of a polyimide-polyamide type coating.

A further object is to provide a coating medium based on the reaction product of an aromatic diamine and an aromatic dianhydride, which can be applied from an aqueous based system, and which is curable to form a flexible, dielectric, clear, temperature-resistant, adherent coating on a substrate.

Still a further object of the present invention is to provide a polymeric coating of the foregoing character which exhibits flexibility and electrical properties of a level required for an electrical insulation coating.

Still another object of the present invention is to produce a coating medium which is aqueous based, has a high solids content and which, when applied as a film coating to a substrate, is curable to form a flexible, clear, temperature-resistant, dielectric, adherent coating having the characteristics and properties of a polyimide-polyamide type coating material.

Still a further object of the invention is to provide a novel coating material which can be prepared in a high solids content organic reaction solution, and subsequently diluted with water to a viscosity suitable for coating without hydrolyzing the material. More particularly, it is an object of this invention to provide a material of the foregoing type which, when applied as a coating to a substrate from an aqueous solution is readily and efficiently heat curable to form a highly cross-linked, flexible, clear, adherent, dielectric, temperature-resistant polymer coating on the substrate.

SUMMARY OF THE INVENTION

In accordance with the foregoing objects, the present invention contemplates a coating composition, particularly with a substantially aqueous base, embodying a low molecular weight monomeric compound produced as the reaction product of an aromatic diamine and an aromatic dianhydride in the molar ratio of two-to-one respectively. The initial reaction takes place in an anhydrous water miscible solvent which is nonreactive with the diamine and dianhydride reactants.

The diamine is first dissolved in the solvent and then the dianhydride is slowly added to form a diamide diacid diamine monomer reaction product in the solvent system. To provide an aqueous base system, the reaction product, in the water miscible organic solvent system, is reacted with a volatile base, such as ammonia or a primary or secondary amine, to produce a water soluble compound. Water is then added to provide an essentially aqueous based coating medium of the desired solids content. The initial reaction is carried out at below imidization temperatures, generally below about 70° C.

Upon application of a coating of the medium to a substrate, the coating may be cured at a temperature between 100°-500° C. to drive off the water and solvent and polymerize the monomer to provide a generally ladder structured polymeric coating, which is clear, flexible, non-tacky, dielectric, and exhibits excellent adhesion to the substrate. Unexpectedly the coating film thus produced exhibits the foregoing properties, that is properties which are generally characteristic of polyamide and polyimide type coatings. Moreover, it has been discovered that the aqueous based coating medium is stable and neither gels nor coagulates nor forms a precipitate upon standing.

The coating medium thus produced is not only highly effective for dip type coating operations, but is also effective for use in electrocoating applications. For electrocoating, the medium may be further diluted with water to an appropriate consistency without affecting the monomer or its polymerization.

DESCRIPTION OF THE PREFERRED EMBODIMENT

The coating composition of the present invention embodies a low molecular weight monomeric compound produced as the reaction product of an aromatic diamine and an aromatic dianhydride in the molar ratio of about two-to-one respectively. The initial reaction takes place in an aprotic solvent system which is nonreactive with or inert to the diamine and dianhydride reactants. The reaction is carried out at a temperature below about 70° C. so that there is a negligible level of imidization resulting in the ortho amide acid product, generally characterized as a diamide diacid diamine (see U.S. Pat. Nos. 3,652,500 and 3,663,510 above). If the reaction solution is heated under controlled conditions, certain desired levels of imidization can be achieved. However, if the heating is carried too far, such as to a level greater than about 90%, depending upon the particular diamine and dianhydride selected, the imide thus formed precipitates as an insoluble, inflexible, unreactive solid precipitant.

Quite unexpectedly, it has been discovered that if a thin film is formed of the monomeric reaction product prior to the applicaton of heat and the film is heated, a clear, tough, flexible, highly, cross-linked polymeric film is produced. The present invention is concerned with the production of such a film by forming a diamide diacid diamine monomer, applying a coating of that monomer to a substrate and curing the coating to produce the polymer film.

The coating medium may be an organic based or an aqueous based medium. To the latter end, following the formation of the reaction product of the diamide diacid diamine in an organic solvent system, a volatile base is added in an amount sufficient to react with that reaction product to produce a water soluble compound. The system is then diluted with water to provide an essentially aqueous based coating medium. A coating of the monomeric reaction product in the aqueous medium is then applied to a substrate as a thin film and the coating film is then cured to convert it to a highly cross-linked polymeric substance.

The initial reaction between the diamine and the dianhydride is carried out in a high solids content organic solvent system, with the reactants in the molar ratio of two-to-one respectively, that is in the molar ratio of two moles of aromatic diamine to one mole of aromatic dianhydride. To this end, the diamine, in the proportion of two moles, is first dissolved in the organic solvent. The dianhydride, in proportion of one mole, is then slowly added or trickled into the diamine solution. The temperature is maintained generally at about 70° C. or below, and preferably at about 50° C. or below. As the dianhydride is trickled into the diamine solution, one mole of the dianhydride immediately reacts with two moles of the diamine to produce the diamide diacid diamine monomeric coating material desired. It has been observed that, if the one mole of dianhydride is dissolved first, and the two moles of diamine is next charged, polymerization occurs resulting in a higher molecular weight material. On the other hand, if the dianhydride is added rapidly, such as in a chunk or as a slug, the dianhydride reacts faster than it dissolves, thereby leaving "islands" of unreacted dianhydride surrounded by reacted dianhydride.

It has further been discovered that the diamide diacid diamine reaction product, that is the monomer or "polymer precursor", may be converted to an aqueous based system by the addition of a volatile base in an amount sufficient to convert the reaction product to a water soluble form, followed by dilution of the system with water to form an aqueous-organic coating medium, without hydrolyzing or destroying the diamide diacid diamine monomer. This reaction is generally initially carried out in the organic solvent at a solids level greater than 40% solids by weight, and more often greater than 50% solids by weight. Upon the addition of the volatile base and subsequent dilution with water, the solids content of the aqueous-organic system is reduced to a level suitable for use in coating applications. A substantial savings can thus be realized in the organic solvent required to initially produce the monomer. This is accomplished because of the use of a high solids content reaction solution, and the subsequent use of water to dilute the system to a suitable coating consistency.

A coating of the monomeric diamide diacid diamine reaction product is then applied to a substrate such as sheet, wire, etc., from either an organic solution or, more preferably from an environmental and ecological standpoint, from an aqueous solution. As pointed out above, whereas elevated temperatures result in imidization of the solution and precipitation of the monomer as an insoluble, inflexible imide, it was unexpectedly found that, upon the application of a coating of the monomer to the substrate as a thin film, the coating film is curable at a temperature sufficient to convert the coating to a polyermic, highly cross-linked flexible film material. Unexpectedly, the film material thus produced is highly flexible, tough, clear, of good dielectric strength, and suitable for electrical applications.

The aromatic dianhydrides that are useful in accordance with this invention are those having the generally formula:

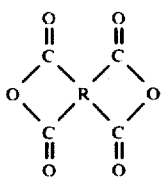

wherein R is a tetravalent radical containing two benzene rings joined by a chemically inert, thermally stable moiety selected from the group consisting of an alkylene chain having fromm 1 to 3 carbon atoms, an alkyl ester, a sulfone and oxygen, each pair of carboxyl groups being attached to different adjacent carbon atoms of a single separate ring. These dianhydrides include, for example, 4,4'-(2-acetoxy-1,3-glyceryl)bis-anhydro trimellitate,
3,3',4,4'-benzophenonetetracarboxylic dianhydride,
bis(3,4-dicarboxyphenyl) sulfone dianhydride,
bis(2,3-dicarboxyphenyl) methane dianhydride,
2,2-bis (3,4-dicarboxyphenyl)propane dianhydride,
bis (3,4-dicarboxyphenyl)ether dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
and the like.

The aromatic diamines that are useful in accordance with this invention are those having the general formula:

H$_2$N-R'-NH$_2$ wherein R' is a divalent radical selected from the group consisting of

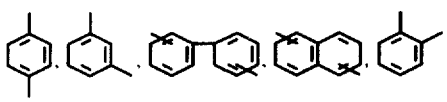

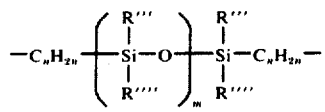

wherein R''' and R'''' are an alkyl or an aryl group having 1 to 6 carbon atoms, n is an integer of from 1 to 4 and m has a value of 0, 1 or more and

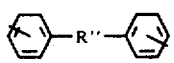

wherein R'' is selected from the group consisting of an alkylene chain having 1–3 carbon atoms,

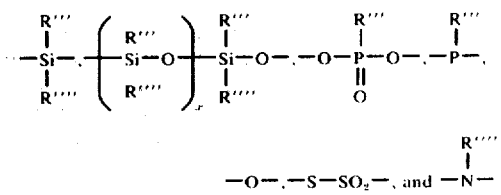

wherein R''' and R'''' are as above-defined and x is an integer of at least 0. In general, the diamines contain between 6 and 16 carbon atoms, in the form of one or two six membered rings.

Specific diamines which are suitable for use in the present invention are:
m-phenylene diamine,
p-phenylene diamine,
4,4'-diaminodiphenyl propane,
4,4'-diaminodiphenyl methane, benzidine,
4,4'-diaminodiphenyl sulfide,
4,4'-diaminodiphenyl sulfone,
3,3'-diaminodiphenyl sulfone,
4,4'-diaminodiphenyl ether,
2,6-diaminopyridine,
bis-(4-aminophenyl)diethyl silane,
bis-(4-aminophenyl)phosphine oxide,
bis-(4-aminophenyl)-N-methylamine,
1,5-diamino naphthalene,
3,3'-dimethyl-4,4'-diamino-biphenyl,
3,3'-dimethoxy benzidine,
m-xylylene diamine,
p-xylyene diamine,
1,3bis-delta-aminobutyltetramethyl disiloxane,
1,3-bis-gamma-aminopropyltetraphenyl disiloxane,
and mixtures thereof.

The organic solvents utilized in accordance with this invention are those organic solvents having functional groups which do not react with either of the reactants, the aromatic diamines or the aromatic dianhydrides, to any appreciable extent. In addition to being inert with respectto the reactants, the solvent utilized must be inert to and a solvent for the reaction product. In general, the organic solvent is an organic liquid, other than either reactant or homologs of the reactants, which is a solvent for at least one of the reactants, and which contains functional groups other than monofunctional, primary and secondary amino groups and other than the monofunctional dicarboxyl anhydro groups. Such solvents include, for example, N-methyl-2-pyrrolidone (sometimes abbreviated NMP), dimethylsulfoxide (DMSO), N-formyl moropholine (NFM), or such organic solvents such as N,N-dimethylmethoxy-acetamide, N-methyl-carprolactam, tetramethylene urea, pyridine, dimethylsulfone, hexamethylphosphoramide, tetramethylenesulfone, formamide, N-methylformamide, N,N-dimethyl formamide, butyrolactone, or N-acetyl-2-pyrrolidone. The solvents can be utilized alone, as mixtures, or in combination with relatively poorer solvents such as benzene, toluene, xylene, dioxane, cyclohexane, or benzonitrile.

The volatile bases that are useful in connection with the present invention for producing a water soluble monomeric reaction product, include ammonia (NH$_3$), ammonium hydroxide (NH$_4$OH), ammonium carbonate [(NH$_4$)$_2$CO$_3$] and primary and secondary aliphatic amines containing up to four carbon atoms, such as methylamine, ethylamine, secondary butylamine, isopropylamine, dimethylamine, diethylamine, dibutylamine, and the like.

In the initial reaction for preparing the coating composition embodying the present invention, an aromatic diamine is reacted with an aromatic dianhydride in the molar ratio of two-to-one respectively, or in other words in the ratio of two moles of the former to one mole of the latter. The reaction product may be expressed by the general formula:

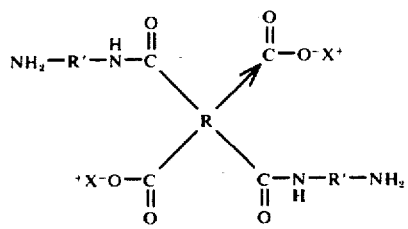

wherein the arrows denotes isomerism, that is where groups may exist in interchanged positions, and R and R' are as defined above. Such a monomeric reaction product or a "polymer precursor" may be generally characterized as a "diamide-diacid-diamine". Upon additional of a volatile base, a compound having the following general formula results:

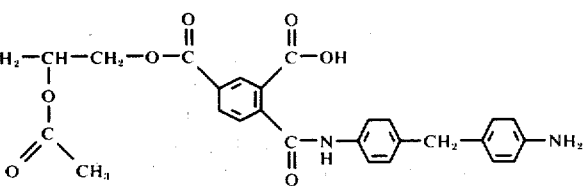

wherein X indicates the positive ion of the volatile base, and R and R' are as defined above. Such compound is water soluble so that the coating composition can be diluted with water to form an aqueous-organic coating medium.

To illustrate the present invention more specifically, the aromatic diamine, 4,4'-diaminodiphenyl methane, also termed p,p-methylene dianiline (abbreviated MDA or simply M), was mixed with an aromatic dianhydride, 3,3',4,4'-benzophenonetetracarboxylic dianhydride (abbreviated BPDA or simply B), in the molar ratio of two moles of diamine to one mole of dianhydride, in an anhydrous N-methyl-2-pyrrolidone (NMP) solvent at about 50% solids. The reaction was spontaneous at a temperature below 70° C. The resulting product is the monomer or "polymer precursor" having the formula

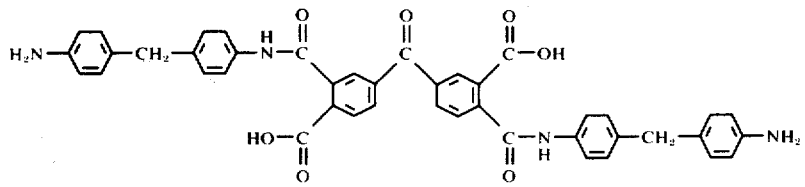

which formula may be conveniently abbreviated as MBM. For more details on the reaction of the diamine and dianhydride see U.S. Pat. Nos. 3,652,500 and 3,663,510 referred to above.

Similarly, p,p'-methylene dianiline was condensed with 4,4'-(2-acetoxy-1,3-glyceryl)bis-anhydro trimellitate, in the molar ratio of two-to-one, respectively in NMP solvent, at greater than 40% solids and a temperature generally below 70° C. The resulting monomer or "polymer precursor" produced has the formula

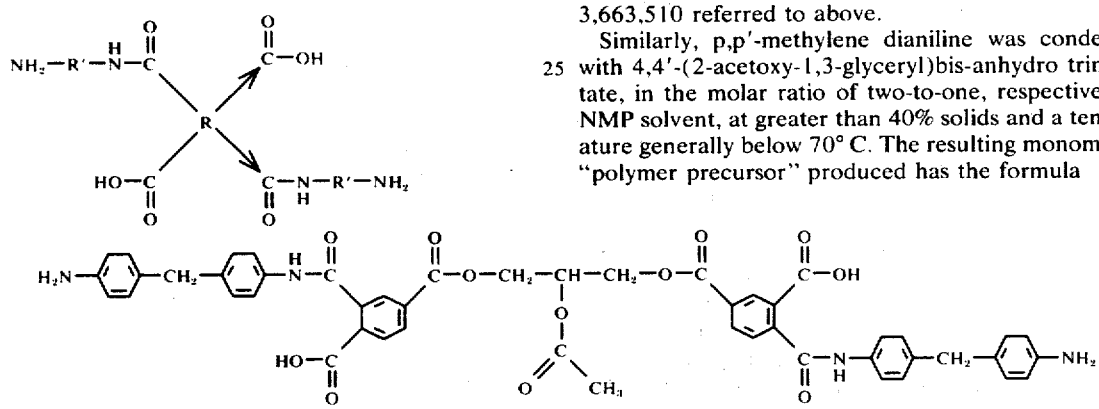

which monomeric compound may be abbreviated as MAM.

Both the MBM and the MAM monomeric compounds are insoluble in water, but may be made water soluble by the addition of a volatile base such as ammonia or a volatile amine. The result is a water soluble diamine monomer or polymer precursor. The water soluble material may be diluted with water to produce a coating medium having the desired solids content. For example, an aqueous NMP solution of the MAM or MBM monomer at 25% solids was applied to coat an aluminum substrate with a thin film of the monomer. Quite unexpectedly, the films were found to be curable at temperatures between 150° C. and 250° C. to produce clear, non-tacky films with excellent adhesion to the substrate.

It should be noted that, in contrast to the effect of curing a thin film coating on a substrate, an attempt to further polymerize the monomer in solution by heating bulk solution in a reaction at a temperature in the range of 100° C.–120° C., results in precipitation of particles of the monomer, generally believed to be in the form of infusible, insoluble imides, namely intramolecular imidization products having the general formula:

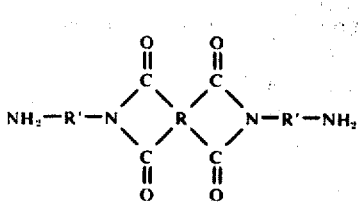

wherein R and R' are as defined above.

Monomeric or "polymer precursor" compounds have been prepared from various combinations of aromatic dianhydrides and aromatic diamines. Among such compounds are those prepared with the following molar ratio: 2.0 moles 1,3-diamino benzene, also termed M-phenylene diamine, and 1.0 mole 3,3',4,4' benzophenonetetracarboxylic dianhydride, 2.0 moles 4,4'-diaminodiphenyl ether, also termed p,p'-oxydianiline, and 1.0 mole of 3,3',4,4'-benzophenonetetracarboxylic dianhydride; 2.0 moles m-phenylene diamine and 1.0 mole 4,4'-(2-acetoxy-1,3-glyceryl)bis-anhydro trimellitate; 2.0 moles p,p'-oxydianiline and 1.0 mole 4,4'-(2-acetoxy-1,3-glyceryl)bis-anhydro trimellitate. Such compounds were prepared in an N-methyl-2-pyrrolidone (NMP) solvent, ammonia or a suitable amine was added, and the solutions diluted with water to a 25% solids by weight solution. Thin films (0.2–0.5 mil.) were applied to a variety of substrates such as copper, aluminum, steel and the like, and the films were cured by heating to above 150° C.

When properly cured, the coatings resulting in flexible, tough, clear films showing excellent adhesion to the aluminum substrate. These films, following thermal exposure such as 154 hours at 250° C., were found to exhibit low weight loss and excellent retention of adhesion and flexibility on aluminum. These properties were exhibited by films formed from the water insoluble versions of the coated compositions as well as from films formed from highly aqueous solvent systems. The various films and properties of films as applied to an aluminum substrate are summarized in Table I.

charged 132.2 g. N-methyl-2-pyrrolidone having a water content below 200 p.p.m. The NMP solvent was agitated and 132.2 g. (0.667 moles) 4,4'-diaminodiphenyl methane (99% purity) was charged over a period of about 30 sec. There resulted a clear solution I. To a second similar reactor equipped with a heating mantle, was charged 160.7 g. N-methyl-2-pyrrolidone having a water content below 200 p.p.m. The NMP solvent was agitated and heated to a temperature of 60° C. whereupon with agitation 160.7 (0.333 mole) 4,4'-(2-acetoxy-1,3-glyceryl)bis-anhydro trimellitate (99% purity) was charged over a period of about 3 min. There resulted a temperature rise to about 80° C. Stirring was continued for another 5 min. resulting in a clear, homogeneous solution II. Solution II was cooled to about 43° C. and allowed to trickle into solution I over a period of about 2 min. with agitation. The temperature rose to a maximum of 75° C. during the next 5 min. period of agitation. The precent imidization was found to be 0.7 as determined by titration for the carboxylic acid content, in pyridine with tetrabutylammonium hydroxide and with thymol blue as the indicator. The resulting clear solution had a viscosity of 220 cps. and a solids level of 50.0% as the orthoamic acid. It was 47.9% solids as the imide; the latter was determined by exposing 0.50 g. of samples in an aluminum cup having a diameter of about 2.5 inches to a temperature of 150° C. for a period of 90 min.

EXAMPLE 2

To illustrate the effect of heating to imidization temperature, the orthoamic acid product of Example 1 was charged to a reactor equipped with a stirrer, nitrogen atmosphere, thermometer well, heating mantle, and a condenser for collecting water of condensation. The product was then exposed to a temperature of 108° C. for a period of 2.5 hrs. during which 11.2 g. water (0.62 mole) was collected. The material was titrated for carboxylic acid and the percent imidization found to be 93%. On cooling, this solution showed considerable precipitation. The precipitate was collected and ex-

TABLE I

| Polymer Code aq.-NMP solv. 25% solids | Components of repeat mer of polymer chain | Thin film properties (0.2 to 0.5 mil on Al) | | |
|---|---|---|---|---|
| | | 15 in. at 150 C | 15 min. at 150 C + 30 min. at 250 C | Aging after cure* 154 hrs. at 250 C |
| MBM | 2 MDA, 1 BPDA | clear-transparent non-tacky | clear-transparent non-tacky | clear-transparent with sl. darkening, |
| MAM | 2 MDA, 1 AGBA | excellent adh. to Al substrate | excellent adh. to Al substrate | excellent adhesion to Al substrate, |
| OBO | 2 ODA, 1 BPDA | flexibility undeveloped | creasible | excellent flex. and very low wt. loss. |
| OAO | 2 ODA, 1 AGBA | | | The wt. loss was similar to polyimides |
| OPO | 2 ODA, 1 PMDA | | | and considerably less than occurs Alkanex |
| mPBmP | 2 mPDA, 1 BPDA | | | and Imidex** |
| mPAmP | 2 mPDA, 1 AGBA | | | |
| mPOmP | 2 mPDA, 1 PMDA | | | | where
M = p,p'-methylenedianiline
O = p,p'-oxydianiline
mP = M-phenylenediamine
B = 3,3',4,4'-benzophenonetetracarboxylic dianhydride
A = 4,4'-(2-acetoxy-1,3-glyceryl)bis-anhydro trimellitate
*The cure was arbitrarily selected as 15 min. at 150 C. followed by 30 min. at 250 C.
**Alkanex is a General Electric Company trademark for its polyester coating composition (Patent No. 2,936,296) and Imidex is a General Electric Company trademark for its polyesterimide coating composition.

EXAMPLE 1

To a reactor equipped with a stirrer, nitrogen atmosphere, entry port, and a thermometer well, was posed to temperatures of 150° C. for 15 min. followed by 250° C. for 30 min. but showed no signs of film formation. Rather, it was observed that an infusible, sintered, sometimes powdered material was formed.

EXAMPLE 3

The preparation of Example 1 was repeated and the resulting 50.0% solution of the orthoamic acid, at a negligible level of imidization, was diluted with N-methyl-2-pyrrolidone to a solids level of 25%. A thin, wet film was applied to an aluminum, copper and iron substrate, the solvent was removed, and the film cured by heating for 90 min. at 150° C. There resulted a clear tough film with excellent adhesion on the substrate. Additional heating at 250° C. for about 30 min. resulted in a flexible, clear, tough film with excellent adhesion. An 0.0403 inch aluminum round wire was coated, with the aid of appropriate sizes of wire dies, in six passes with an intervening cure schedule per pass as described above. The resulting film was at a total build of 3.0–3.2 mil on the diameter, and exhibited a dielectric strength of 6000 v./mil. This coating further exhibited solvent resistance to a boiling 70/30 mixture of denatured alcohol/toluol. A cut-through or thermoplastic flow test was conducted on the coated wire. A 1000 g. weight was placed on the crossover point of a pair of coated wires crossed at 90°. The sample was positioned in a forced-air oven and the temperature allowed to rise 5° C./min. until the wires made electrical contact under the 1000 g. load. The coating on aluminum had a cut-through temperature of 380° C. An infrared study showed strong spectral indications that the cured polymer films are imides containing both amide and amine groups.

EXAMPLE 4

To 585.0 g. of the solution of Example 1 there was injected subsurfacewise and with agitation 75.0 g. of a 40% aqueous solution of dimethylamine over a period of 2 min. The resulting solution was clear and dilutable with water. With agitation continuing, a mixture of 17.0 g. ethylene glycol n-butyl ether, 5.8 g. N-methyl-2-pyrrolidone, 88.0 g. water, 35.2 g. n-butyl alcohol and sufficient nonylphenol ethylene oxide adduct to result ultimately in 45 p.p.m., was added resulting in a clear solution having a solids level at 36.5% as the orthoamic acid in solution and 36.0% as the imide in a cured film. The solution had a viscosity of 185 cps., and a surface tension of 38.7 dynes/cm. The solution was applied to glass, aluminum and copper substrates with the aid of a doctor blade and exposed to a cure schedule of 15 min. at 150° C. followed by 30 min. at 200° C. and 30 min. at 250° C. The resulting 0.2 to 0.5 mil films were tough, clear, and exhibited excellent adhesion to these substrates.

EXAMPLE 5

To 585 g. of the solution of Example 1 there was injected subsurfacewise and with agitation 44.7 ml. of 28% ammonia water over a period of 2 min. The resulting solution was clear and dilutable with water. With agitation continuing, a mixture of 17.0 g. ethylene glycol n-butyl ether, 5.8 g. N-methyl-2-pyrrolidone, 104.0 g. water, 35.2 g. n-butyl alcohol and sufficient nonylphenol-ethylene oxide adduct to result ultimately in 45 p.p.m. was added, resulting in a clear solution having a solids level at 37.6% as the orthoamic acid in solution and 36.0% as the imide in a cured film. The solution had a viscosity of 224 cps., surface tension of 39.5 dynes/cm., and a pH of 7.6 at 24° C. This material cured to a thin film 0.2 to 0.5 mil in thickness using a cure schedule of 150° C. for 15 followed by 250°C. for 30 min. and exhibited excellent adhesion on glass, copper, iron and aluminum.

The solution of Example 5 was die applied to 0.0403 inch aluminum round conductor using appropriate wire die sizes, in six passes with an intervening cure per pass, to produce a total build of 2.83.2 mil on the diameter. A cut-through or thermoplastic flow test was conducted on the coated conductor. A 1000 g. weight was placed on the cross-over point of a pair of coated wires crossed at 90°. The set-up was positioned in a forced-air oven which allowed a temperature rise of 5° C./min. The temperature at which the pair of wires made electrical contact under this load was found to be 362° C. When a sample of this coated wire was placed in a box of lead shot and exposed to an increasing voltage, the insulating film was found to exhibit a dielectric strength of about 6000 v./mil. The cured film was removed from another sample of the wire and a thermogravimetric analysis was made with a duPont Model No. 900 Analyzer and the No. 950 TGA attachment. A 5 mg. sample was run at a heating rate of 5° C./min. in air. The results show that appreciable weight loss commences at about 340° C., at which point the loss was 6%. There is a change in slope at 400° C. where the weight loss was 19%. The 50% weight loss point was 555° C. This TGA behavior is somewhat comparable to electrical grade polyesterimides. An infrared study showed strong spectral indications the cured polymer films were imides containing amide and amine groups.

EXAMPLE 6

To the first of the reactors of the type cited in Example 1 was charged 132.2 g. N-methyl-2-pyrrolidone having a water content below 200 p.p.m. The NMP solvent was agitated and 132.2 g. (0.667 mole) of 4,4'-diaminodiphenyl methane (99% was charged with agitation over a period of 30 sec. resulting in a clear solution. To the second reactor was charged 429.4 g. N-methyl-2-pyrrolidone having a water content below 200 p.p.m. The NMP solvent was was agitated and heated to a temperature of 50° C. Whereupon 107.3 g. (0.333 mole) of 3,3',4,4'-benzophenonetetracarboxylic dianhydride was charged over a period of 2 min. with agitation. Stirring was continued for another 5 min. and the solution allowed to cool to 30° C. The solution of dianhydride was then trickled into the diamine solution with agitation over a period of 3 min. Stirring was continued for a period of 10 min., resulting in a maximum temperature of 55° C. The material was titrated for carboxylic acid and the percent imidization found to be less than 1%. The resulting clear solution had a viscosity of 104 cps. at 24° C. at a solids level of 29.9% as the orthoamic acid solution and 28.4% as the imide (cured) film, the latter being determined by exposing one gram of sample in an aluminum cup having a diameter of about 2.5 inches to a temperature of 150° C. for a period of 90 min. When a film of the solution was formed on aluminum, iron, copper or glass and exposed to temperatures of 150° C. for 15 min. followed by 250° C. for 30 min., there resulted a smooth, clear, tough adhering film.

EXAMPLE 7

To a reactor equipped with a thermometer well, heating mantle and a condenser for collecting water of condensation from the reactor was charged the entire set of raw materials in sequence as per Example 6. The resulting 29.9% orthoamic acid solution was then exposed to a temperature of 110° C. for a period of 2.5 hrs. during which 11.7 g. (0.65 mole) water was collected. On cooling this solution to 25° C. there appeared considerable flocculated-insoluble material. This material was titrated for carboxylic acid and the percent imidization was found to be about 98%. When this material was exposed to 150° C. for 15 min. followed by 250° C. for 30 min. there resulted sintered bead-to-powder like, infusible material. The material was not a film former and showed little or no signs of adhesion to any substrate. The infrared spectrum indicated imide with absence of amide groups.

EXAMPLE 8

To 200.0 g. portions of a large batch of the solution prepared as described in Example 6 was added a mixture of 9.5 g. n-butyl alcohol, 0.5 g. N-methyl-2-pyrrolidone and sufficient nonylphenol-ethylene oxide adduct to provide a level of 90 p.p.m. of this material in the system. The resulting clear solution had a viscosity of 80 cps. at 24° C. at a solids level of 28.5% as the orthoamic acid and 27.0% as the imide. An 0.0403 inch diameter copper conductor and an 0.0403 inch diameter aluminum conductor wire was coated in a conventional wire enamelling tower at a wire speed of about 40 ft./min. using appropriate wire dies, such that the overall build was 2.8–3.2 mil on the diameter. An electrical burnout test was conducted on the resulting coated copper conductor using a Techrand Wire Burnout Tester Model HBT-1. The test was conducted on a twisted pair of wires having nine twists per five inches made under three pounds tension. The amperage was set at 36 amps. initially and increased two amps every 180 sec. The sample ran for 1231 sec. before failure.

In another electrical property evaluation of the film formed on the coated 0.0403 copper conductor, and also a similarly coated 0.0403 aluminum conductor, a cut-through or thermoplastic flow test was made. A 1000 g. weight was placed on the crossover point of a pair of coated wires crossed at 90°. The setup was positioned in a forced-air oven equipped with necessary thermocouples and recorders, and the temperature allowed to rise at a rate of 5° C./min. In this test an electrical circuit is completed between the two crossed wires when the temperature is reached such that the wires cut-through under the 1000 g. weight, that temperature is noted as the cut-through temperature. The coated 0.0403 inch copper and aluminum conductors were exposed to temperature increases to 500° C., the limit of the apparatus, and showed no sign of failure. By way of comparison a typical electrical grade polyester insulation for this wire size with this weight would generally fail in the temperature range of 220°to 270° C., polyesterimides would generally fail in the range of 340°to 400° C., and polyimides would not fail at 500° C.

Other properties of the coated wire included 0-5 breaks per 100 ft. of wire at 3000 v. using a standard continuity tester. Using a box containing lead shot a wire was exposed to increasing voltages at the rate of 500 v./sec. and found to withstand 9000 v. before failure or 6000 v./mil. Solvent resistance was evaluated using a 70/30 mixture of denatured alcohol and toluol by immersing wire sample for five min. at the boiling point with no evidence of swelling or blistering. An infrared spectrum of the insulating film showed strong spectral indications that the cured polymer film is an imide containing amide and amine groups, or possibly a polyamideimide cntaining amine groups.

EXAMPLE 9

To 400 g. portions of a large batch of solution prepared as described in Example 6 was added 22.4 ml. of 28% aqueous ammoniacal solution subsurfacewise and with agitation, over a period of 1.5 min. To the reactor was then charged, for each 400 g. portion 21.1 g. of a mixture of 95% n-butyl alcohol and 5% N-methyl-2-pyrrolidone and sufficient amount of nonylphenolethylene oxide adduct such that the resulting total system had about 60 p.p.m. of the latter component. There resulted a clear solution having a viscosity of 112 cps. at 24° C. at a 27.0% solids level as the orthoamic acid and 25.6% as the imide. The latter was determined by exposing a thin film of the liquid to 150° C. for a period of 90 min. This solution was water reducible. Round copper and aluminum conductors were coated in a conventional wire enamelling tower at a wire speed of about 40 ft./min. using seven appropriate wire dies, resulting in a build on the diameter of 2.8–3.2 mil. Using the burnout test described in Example 8, the twisted pair sample of the copper conductor withstood 1260 sec. before failure. Using the test procedure for determining cut-through temperature as cited in Example 8, the coated copper and aluminum conductors were found to have a cut-through temperature in excess of 500° C. in both cases. Other properties of this wire included 0–4 breaks per 100 ft. of wire at 3000 v. using the standard continuity tester, and a dielectric strength of about 6000 v./mil.

The cured film was removed from another sample of the wire and a thermogravimetric analysis made with a duPont Model No. 900 Analyzer and the No. 950 TGA attachment. A 5 mg. sample was run at a heating rate of 5° C./min. in air. The results showed that appreciable weight loss commenced at about 500° C. where the weight loss was 6%. The 50% weight loss point occurred at 570° C. This is comparable to conventional high molecular weight aromatic polyimides made from 1,2,4,5-benzenetetracarboxylic dianhydride and 4,4'-diaminodiphenyl ether, and from 3,3',4,4'-benzophenone tetracarboxylic dianhydride and 4,4'-diaminodiphenyl methane. An infrared spectrum of the film showed strong sprectral indications that the polymer is an imide containing amide and amine groups or possibly a polyamideimide containing amine groups.

EXAMPLE 10

To a reactor equipped with a stirrer, nitrogen atmosphere, entry port, and a thermometer well was charged 108.1 g. N-formyl morpholine having a water content below 200 p.p.m. The solution was agitated and 108.1 g. (1.0 mole) m-phenylene diamine was charged over a period of about 30 sec. There resulted a clear solution I. To a second similar reactor equipped with a heating mantle, was charged 161.0 g. N-formyl morpholine having a water content below 200 p.p.m. The solution was agitated and heated to a temperature of 50° C. whereupon with agitation 161.0 g. (0.05 mole) 3,3',4,4'-benzophenonetetracarboxylic dianhydride was charged over a period of 3 min. There resulted a temperature rise to 76° C. Stirring was continued for another 5 min. resulting in a clear homogeneous solution II. The solution II was cooled to about 40° C. and allowed to trickle into solution I over a period of about 2 min. with agitation. The temperature rose to a maximum of 73° C. during the next 5 min. period of agitation. The resulting clear solution had a viscosity of 290 cps. and a solids level of 50.0% as the orthoamic acid.

EXAMPLE 11

A portion of the solution of Example 10 was diluted with N-formyl morpholine to a solids level of 23.5%. Wet films were metered on glass and on aluminum substrates with the aid of a doctor blade such that treatment with a cure schedule of 30 min. at 150° C., 30 min. at 200° C. and 30 min. at 250° C. resulted in a film build of 0.2 to 0.5 mil. The films were clear, tough, very flexible on the bendable substrate, and exhibited excellent adhesion to both substrates.

EXAMPLE 12

To 269.1 g. of the 50.0% solids solution of Example 10 was injected subsurfacewise and with agitation a mixture of 100 ml. water and 33.7 ml. of 28% ammonia water over a period of 2 min. The resulting solution was clear and dilutable with water. While continuing agitation, a mixture of 23.4 g. n-butyl alcohol, 2.2 g. N-formylmorpholine, 100 ml. water and sufficient nonylphenol ethylene oxide adduct to provide 60 p.p.m. in the total formulation was added, resulting in a clear solution having a solids level at 25.9% as the orthoamic acid and 24.2% as the imide. The solution had a viscosity of 288 cps., surface tension of 37.0 dynes/cm., and a pH of 7.4 at 24° C. When cured as a 0.2 to 0.5 mil film on aluminum, copper, or iron substrates, using a cure schedule of 150° C. for 15 min., 300° C. for 30 min. and 250° C. for 30 min., there resulted a clear, tough and flexible film.

EXAMPLE 13

To a reactor equipped with a stirrer, nitrogen atmosphere, entry port and a thermometer well was charged 200.4 g. N-methyl-2-pyrrolidone. The NMP solvent was agitated and 200.4 g. (1.0 mole) 4,4'-diaminodiphenyl ether was charged over a period of 30 sec. There resulted a clear solution I. To a second similar reactor equipped with a heating mantle was charged 161.0 g. N,N-dimethylformamide (DMF). The DMF solvent was heated to a temperature of 50° C. whereupon with agitation 161.0 g. (0.50 mole) 3,3',4,4'-benzophenone-tetracarboxylic dianhydride was charged over a period of about 3 min. There resulted a temperature rise to about 70° C. Stirring was continued for another 5 min. resulting in a clear homogenous solution. The solution was cooled to about 37° C. and allowed to trickle into solution I over a period of about 3 min. with agitation. The temperature rose to a maximum of 68° C. during the next 10 min. period of agitation. The resulting clear solution was at 214 cps. and a solids level of 50.0% as the orthoamic acid. The percent imidization was determined from a titration of the carboxylic acid groups and found to be 1.2%.

EXAMPLE 14

A portion of the solution of Example 13 was diluted with N-methyl-2-pyrrolidone to a solids level of 19.0% and a wet film drawn on aluminum strip with the aid of a doctor blade. Upon application of a cure schedule of 30 min. at 150° C., 30 min. at 200° C. and 30 min. at 250° C. there resulted a clear, tough, flexible film exhibiting excellent adhesion.

EXAMPLE 15

To a reactor equipped with a stirrer, nitrogen atmosphere, entry port and a thermometer well was charged 108.1 g. N-methyl-2-pyrrolidone followed by 108.1 g. (1.0 mole) m-phenylene diamine, resulting in a clear solution I. To a second similar reactor equipped with a heating mantle was charged 241.0 g. N-methyl-2-pyrrolidone. The NMP solvent was heated to 55° C. whereupon with agitation 241.0 g. (0.50 mole) 4,4'-(2-acetoxy-1,3-glyceryl)bis-anhydro trimellitate was charged over a period of 3 min. and stirring continued for an additional 10 min. period during which the temperature reached a maximum of 68° C. The solution was cooled to about 30° C. and allowed to trickle into solution I over a period of about 3 minutes with agitation. The temperature peaked at 65° C. during the additional 15 minute period of agitation. The resulting homogeneous solution in the reactor was allowed to cool to 35° C. whereupon with agitation a mixture of 200 ml. water and 67.0 ml. of 28% ammonia water was injected subsurfacewise over a period of 2.5 min. With agitation continuing a mixture of 50.0 g. n-butyl alcohol, 4.0 g. N-methyl-2-pyrrolidone, 200 ml. water sufficient nonylphenolethylene oxide adduct to provide 45 p.p.m. was added. The resulting clear solution had a solids level of 29.0% as the orthoamic acid in solution and 27.4% as the imide in a cured film. The solution had a viscosity of 175 cps., surface tension of 36.8 dynes/cm., and a pH of 7.1 at 24.5° C. A 0.2 to 0.5 mil film formed on aluminum strip with a cure schedule of 15 min. at 150° C., 30 min. at 200° C. and 30 min. at 250° C. was found to be clear, adherent, tough and flexible.

EXAMPLE 16

To the first of the reactors of the type referred to in Example 10 was charged 132.2 g. N-formyl morpholine (NFM) having a water content below 200 p.p.m. The NFM solvent was agitated and 132.2 g (0.667 mole) of 4,4'-diaminodiphenyl methane (99% purity) was charged resulting in a clear solution I. To a second similar reactor equipped with a heating mantle was charged 429.4 g. N-formyl morpholine having a water content below 200 p.p.m. The NFM solvent was agitated and heated to a temperature of 58° C. whereupon 107.3 g. (0.333 mole) of 3,3',4,4'-benzophenonetetracarboxylic dianhydride was charged over a period of 4 min. with agitation and the stirring continued fr an additional period of 15 min. After cooling to 28° C. the solution of dianhydride was trickled into the diamine solution in the first reactor with agitation over a period of 7 min. The stirring was continued for a period of about 15 min. The maximum temperature was 74° C. The resulting clear solution was titrated for carboxylic acid and the percent imidization found to be 0.6%. The contents of the reactor was allowed to cool to 32° C. To the reactor was added 65.6 g. of a 60% aqueous solution of isopropylamine, subsurfacewise and with agitation over a period of 2.5 min. To the reactor was then charged 42.0 g. of a mixture of 95% n-butyl alcohol and 5% N-formyl morpholine and sufficient nonylphenolethylene oxide adduct such that the resulting formulation was at 50 p.p.m. with respect to the nonionic surfactant. There resulted a clear solution having a viscosity of 278 cps. at 25° C. at a solids level of 27.5% as the orthoamic acid. The solution was water reducible. A 0.2 to 0.5 mil film formed on aluminum strip with a cure schedule of 15 min. at 150° C., 30 min. at 220° C. and 30 min. at 250° C. was clear and tough, and exhibited excellent adhesion and flexibility.

REACTION ROUTE monomeric coating medium, it is possible that, upon heat cure, a ladder polymer structure results having benzophenone rungs and aromatic polyimide side posts with pendant amines, which structure may be written as follows:

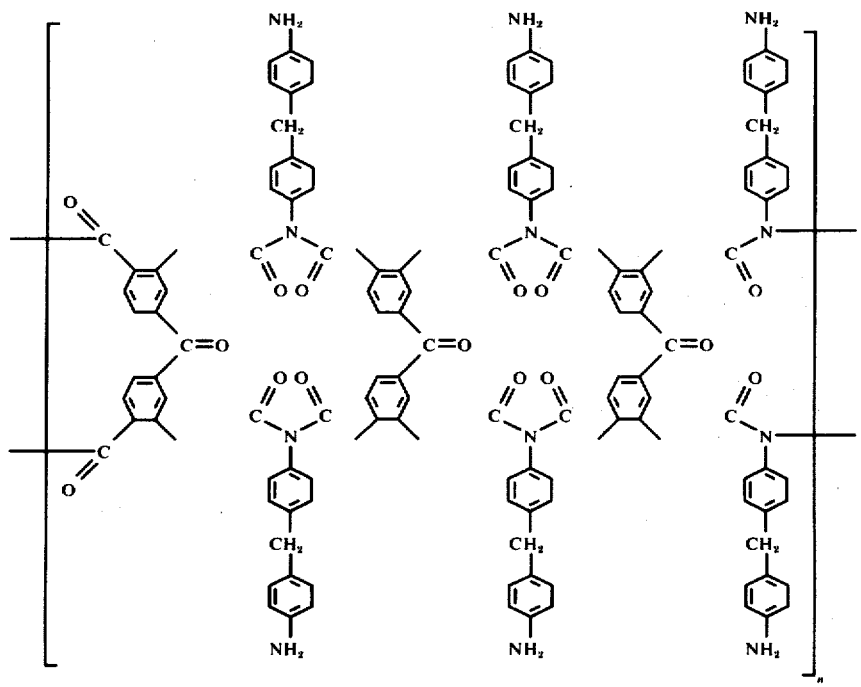

Upon curing the coatings of the diamide-diacid-diamine coating medium above described, after application thereof as thin films to substrates, such as, for example, the application of the medium to form a thin film coating on wire, as least two possible reaction routes, and more probably a mixture of both, may account for the properties that have been observed for the coated films. To account for the unexpected flexible films produced as well as for the loss of two mole of water per monomeric unit upon cure of a coating thereof (see Examples 2 and 6), if it is assumed that intermolecular imidization occurs upon heating the diacid-diamide-diamine thin film coating, in contrast to the intramoleculr imidization which occur upon heating the monomer in bulk or in solution, and also assuming for purposes of illustration the use of the MBM Such a structure, based on intermolecular imidization, could account for the flexibility and other properties unexpectedly obtained upon curing coatings and films of the monomer, in contrast to the non-flexible, infusible, sintered-powder particles obtained through intramolecular imidization. That an imidization reaction occurs is noted in the weight loss of exactly two moles of water per mole of MBM. It should also be noted that two moles of water are also lost in the intramolecular imidization reaction which results in the formation of an infusible powder (see Examples 2 and 6).

On the other hand, if only intermolecular amidization results, again assuming a thin film coating of MBM monomeric coating medium, it is possible that, upon heat cure, a ladder polymer results having benzophenone rungs and aromatic polyamide side posts, which polymer structure may be written as follows:

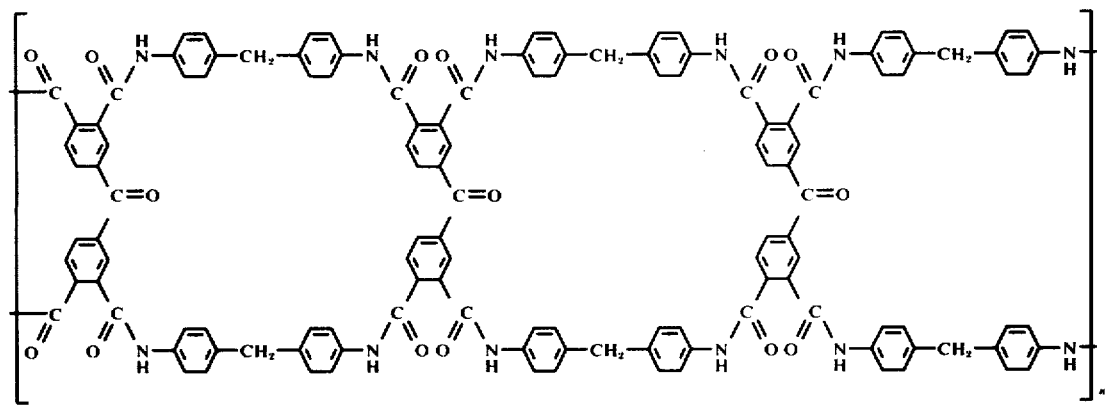

More probably, a mixture of the ladder polyimide-polyamine structure and the ladder polyamide structure results upon heat cure of the coating or film of the diamide-diacid-diamine monomer. That this is the case is supported by preliminary infrared analysis results which reveals the presence, simultaneously, of amine groups, amide groups, and imide groups, and do not show the presence of free carboxyl groups. Although the above structures have been written for the MBM monomer, similar polymer structures analogous to those written above can be readily written for each of the monomeric compounds referred to above. In all cases, it is believed that a ladder type polymeric structure results.

While certain illustrative compositions and methods embodying the present invention have been described above in considerable detail, it should be understood that there is no intention to limit the invention to the specific embodiments which have been disclosed by way of illustration and not by way of limitation. On the contrary, the intention is to cover all modifications, alternatives, equivalents and uses falling within the spirit and scope of the invention as expressed in the appended claims.

I claim as my invention:

1. A heat curable monomeric coating material comprising an aromatic diamide diacid diamine formed as the reaction product of an aromatic diamine and an aromatic dianhydride in the molar ratio of two-to-one respectively.

2. A heat curable monomeric coating material as defined in Claim 1 wherein said aromatic diamine is selected from the group consisting of diamine having the general formula:

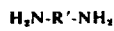

wherein R' is a divalent radical selected from the group consisting of

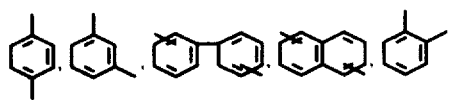

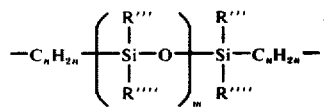

wherein R''' and R'''' are an alkyl or an aryl group having 1 to 6 carbon atoms, n is an integer of from 1 to 4 and m has a value of 0, 1 or more and

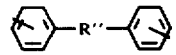

wherein R'' is selected from the group consisting of an alkylene chain having 1–3 carbon atoms,

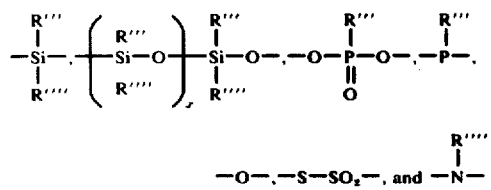

wherein R''' and R'''' are as above-defined and x is an integer of at least 0; and said aromatic dianhydride is selected from the group consisting of dianhydrides having the generaly formula:

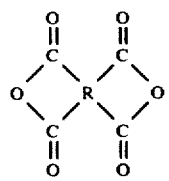

where R is a tetravalent radical containing two benzene rings jointed by a chemically inert, thermally stable moiety selected from the group consisting of an alkylene chain having from 1 to 3 carbon atoms, an alkyl ester, a sulfone and oxygen, each pair of carboxyl groups being attached to different adjacent carbon atoms of a single separate ring.

3. A heat curable monomeric coating material as defined in claim 1 wherein said aromatic diamine is selected from the group consisting of 4,4'-diaminodiphenyl ether, and 1,3-diamino benzene and mixtures thereof, and said aromatic dianhydride is selected from the group consisting of 3,3',4,4'-benzophenonetetracarboxylic dianhydride and 4,4'-(2-acetoxy-1,3-glyceryl)bis-anhydro trimellitate and mixtures thereof.

4. The heat curable monomeric coating material

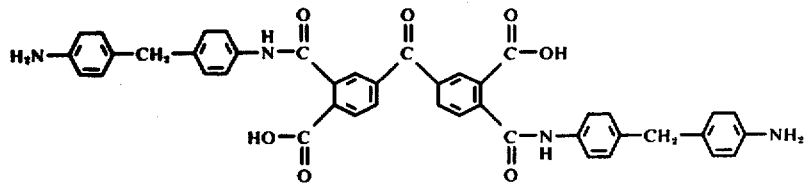

5. The heat curable monomeric coating material

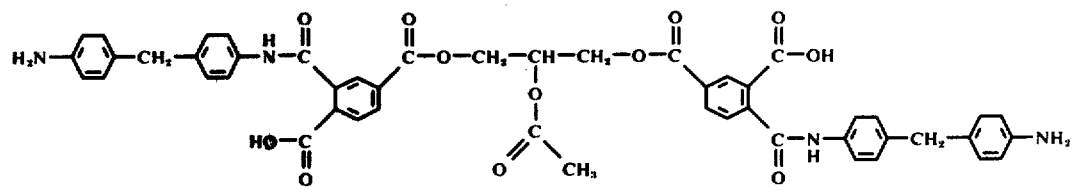

* * * * *

UNITED STATES PATENT AND TRADEMARK OFFICE
CERTIFICATE OF CORRECTION

PATENT NO. : 4,003,947
DATED : January 18, 1977
INVENTOR(S) : Marvin A. Peterson It is certified that error appears in the above-identified patent and that said Letters Patent are hereby corrected as shown below:

Col. 1, line 4, before the heading "FIELD OF THE INVENTION" insert the following heading and paragraph:
--Cross Reference to Related Applications --This application is a continuation-in-part of copending application Ser. No. 467,615, filed May 6, 1974, by Marvin A. Peterson, for "Process and Composition for Producing Coating Material," which application is, in turn, a continuation of copending application Ser. No. 822,899, filed May 8, 1969, by Marvin A. Peterson, for "Improved Process for Producing Wire Coatings from Prepolymeric Materials," now abandoned.--;

line 13, after "character" insert --,-- (comma);
line 20, delete "exampe" and insert --example--;
line 39, after "to" (first occurrence) insert --a--;
line 42, delete "amide" and insert --imide--.

Col. 5, line 5, delete "polyermic" and insert --polymeric--;
line 25, delete "fromm" and insert --from--.

Col. 6, line 36, delete "3bis" and insert --3-bis--;

line 55, delete "such".

Col. 7, line 53, delete "O⁻X⁺" and insert --O⊖X⊕--;
line 57, delete "⁺X⁻O" and insert --⊕X⊖O--.

Col. 8, line 1, delete "MDA" and insert --"MDA"--;
line 1, delete "M" and insert --"M"--;
line 3, delete "BPDA" and insert --"BPDA"--;
line 3, delete "B" and insert --"B"--;
line 21, delete "MBM" and insert --"MBM"--;
line 27, after "and" insert --at--;
line 46, delete "MAM" and insert --"MAM"--.

Col. 10, line 6, delete "I" and insert --"I"--;

UNITED STATES PATENT AND TRADEMARK OFFICE
CERTIFICATE OF CORRECTION

PATENT NO. : 4,003,947
DATED : January 18, 1977
INVENTOR(S) : Marvin A. Peterson It is certified that error appears in the above-identified patent and that said Letters Patent are hereby corrected as shown below:

Col. 10, line 15, delete "II" and insert --"II"--;
        line 19, delete "precent" and insert --percent--.
Col. 11, line 60, delete "nonyll-" and insert --nonyl- --.

Col. 14,
        line 44, delete "none tetracarboxylic" and insert
            --nonetetracarboxylic--;
        line 61, delete "0.05" and insert --0.50--.
Col. 15, line 24, delete "mylmorpholine" and insert --myl morpho-
            line--;
        line 48, delete "zophenone-tetracarboxylic" and insert
            --zophenonetetracarboxylic--;
        line 51, delete "homogenous" and insert --homogeneous--.

Col. 17, line 61, delete "mole" and insert --moles--.
Col. 20, lines 39-41, delete "R'''" and insert --R'''--.

$$\begin{array}{c} | \\ Si \\ | \\ R'''' \end{array} \qquad \begin{array}{c} | \\ Si \\ | \\ R'''' \end{array}$$

Signed and Sealed this

Eleventh Day of July 1978

[SEAL]

Attest:

RUTH C. MASON
*Attesting Officer*

DONALD W. BANNER
*Commissioner of Patents and Trademarks*